United States Patent [19]

Gotoh

[11] Patent Number: 4,864,426
[45] Date of Patent: Sep. 5, 1989

[54] CIRCUIT FOR DETECTING SIGNAL LOSS, OR DROP-OUT, IN A DIGITAL SIGNAL PROCESSING SYSTEM WITH A/D CONVERSION

[75] Inventor: Toshio Gotoh, Saitama, Japan

[73] Assignee: Pioneer Electronic Corporation, Tokyo, Japan

[21] Appl. No.: 169,667

[22] Filed: Mar. 18, 1988

[30] Foreign Application Priority Data

Mar. 20, 1987 [JP] Japan ................................ 62-67313

[51] Int. Cl.4 .............................................. H04N 5/94
[52] U.S. Cl. .................................. 358/336; 360/38.1
[58] Field of Search ............... 358/314, 336; 360/38.1, 360/33.1, 36.2

[56] References Cited

U.S. PATENT DOCUMENTS 4,706,132 11/1987 Takayama et al. ................. 358/336

Primary Examiner—Robert L. Richardson
Attorney, Agent, or Firm—Sughrue,Mion,Zinn,Macpeak & Seas

[57] ABSTRACT

A drop-out detector circuit for use in a device such as a video disc player or the like is provided using a minimum of added components. The input analog signal read from the disc is compared with the upper and lower (maximum and minimum) reference levels provided for the A/D converter otherwise provided for converting the input analog signal to digital form. When either limit is exceeded, a drop-out signal is generated.

7 Claims, 2 Drawing Sheets

CIRCUIT FOR DETECTING SIGNAL LOSS, OR DROP-OUT, IN A DIGITAL SIGNAL PROCESSING SYSTEM WITH A/D CONVERSION

BACKGROUND OF THE INVENTION the present invention relates to a drop-out detector circuits, and in particular to drop-out detector circuit in a device for playing back recorded data which processes a signal by digitizing a high-frequency signal component produced by reading a recording medium.

In the prior art, playback systems for reproducing recorded data, for example disc players for video discs prerecorded with FM-modulated image signals, usually employ an analog system for processing the FM image signals from the disc.

However, in view of the increased use of integrated circuits, there are many advantages to using digital rather than analog processing. In order to allow greater functional diversity in the procession of signals and to achieve better picture quality, the applicant has previously proposed (see Japanese Patent Application No. 60-280711) a playback apparatus for recorded data which digitally processes signals read out from a disc.

However, in a playback apparatus for recorded data such as a video disc player the presence of dirt or damage to the recording medium causes gaps, i.e., drop-out, in the signal read out from the recording medium. It is necessary to detect and compensate for these drop-outs. Many types of circuits for detecting drop-out in analog-processing playback devices are known in the prior art, but all require the use of separate circuitry.

SUMMARY OF THE INVENTION

In the view of the abovementioned problems, an object of the present invention is to provide a drop-out detector circuit which enables the detection of drop-out merely by the addition of a simple circuit to existing data playback devices using digital signal processing.

A drop-out detector circuit according to the invention comprises detector means which detects when the amplitude of the signal read from the recording medium exceeds the input parameters of the A/D converter used to digitize the signal read out, and is arranged so that the detector output is used as a drop-out detector signal.

DESCRIPTION OF THE PREFERRED EMBODIMENTS

A preferred embodiment of the invention will now be described in detail with reference to the drawings.

Figure 1:
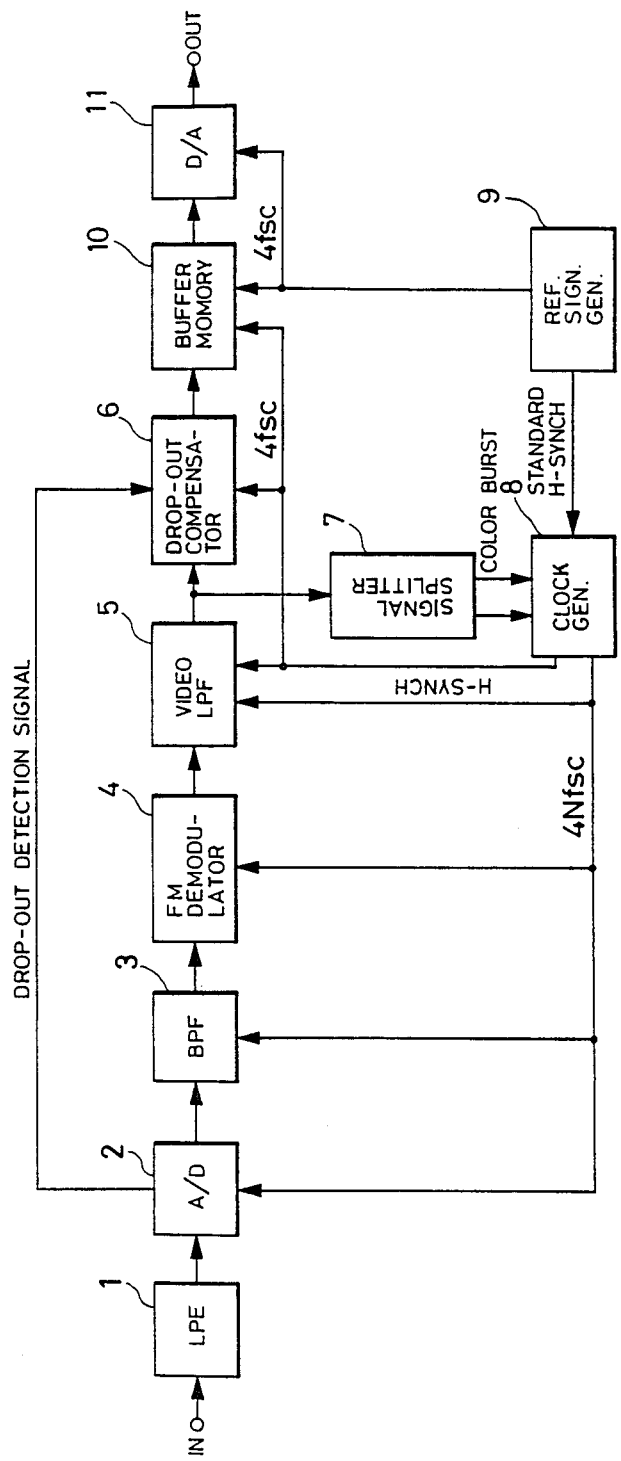
FIG. 1 is a block diagram showing schematically the layout of a device for playing back recorded data provided with a drop-out detector circuit according to the invention.

FIG. 1 is a block diagram showing schematically a device for playing back recorded data provided with a drop-out detection circuit according to the invention.

In this figure, the FM image signal read from a video disc or other recording medium is passed through an analog LPF (Low-pass filter) 1 and then fed to an A/D converter 2. The LPF 1 is provided to remove switching transient distortion from the A/D converter. Further details of A/D converter 2 will be given below; however, it is to be noted here that the A/D converter 2 has a drop-out detection function and that it produces a drop-out detection signal when drop-out is detected. The digitized FM image signal output from the A/D converter 2 is supplied to a digital BPF (bandpass filer 3. The digital BPF 3 extracts the A/D converter output, which contains FM audio signals, only those components required for image signal demodulation and feeds them to the next state, an FM demodulator circuit 4. The FM demodulator circuit 4 may employ, for example, a device proposed by the application in Japanese Patent Application No. 59-262481. The demodulated output of the FM demodulator circuit 4 then is passed to a video LPF 5 where only the baseband component of the image signal is extracted. The digitized image signal passing through the video LPF 5 is supplied to a drop-out compensator circuit 6 and a signal splitter circuit 7. The drop-out compensator circuit 6 responds to drop-out detection signals supplied by the A/D converter 2 so as to compensate for drop-out.

The signal splitter circuit 7 splits and samples, for example, the horizontal synchronizing signal and color burst signal contained in the digitized image signal, and feeds them for the clock generator circuit 8. The clock generator circuit 8 produces a 4 $f_{sc}$ ($f_{sc}$ is the subcarrier frequency) and a $4Nf_{sc}$ (N is any integer greater than 1, for example, 3) clock based on the horizontal synchronizing signal or the color-burst signal received from the signal splitter circuit 7 or a standard horizontal synchronizing signal produced by a reference signal generator circuit 9, thus forming a PLL (phase-locked loop) circuit. The $4f_{sc}$ and $4Nf_{sc}$ clock signals are used as the clocks for digital processing, the $4Nf_{sc}$ signal being used as the sampling clock for the A/D converter 2 and the signal processing clock up to the video LPF 5, the $4f_{sc}$ signal being used for down sampling the output from the video LPF 5.

The digitized image signal output from the drop-out compensator circuit 6 is written into the buffer memory 10 using the $4f_{sc}$ clock produced by the clock generator circuit 8 based on the color-burst signal sampled from the reproduced image signal. Data is read from the buffer memory 10 using the $4f_{sc}$ reference clock produced by the referenced signal generator circuit 9. In this way, by reading data from the buffer memory 10 using a stable reference clock that is unrelated to the replay image signal, jitter in the replay image signal can be absorbed. The digitized image signal read from the buffer memory 10 is converted back to an analog signal by a D/A (digital/analog) converter 11 and output as the reproduced image.

Figure 2:
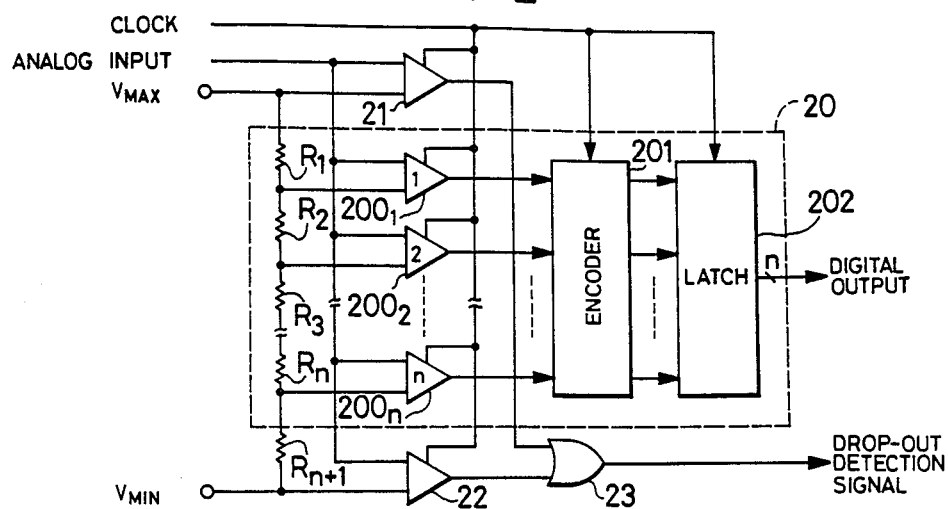
FIG. 2 is a block diagram illustrating a preferred embodiment of the invention.
Figure 3:
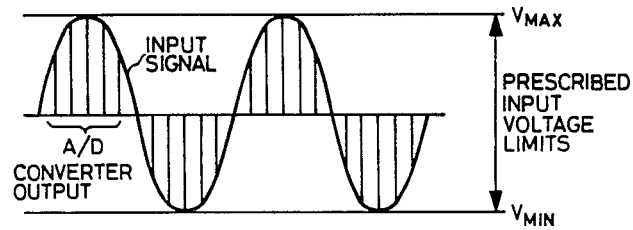
FIG. 3 is a waveform diagram illustrating the inputs and outputs of the A/D converter in FIG. 2.

FIG. 2 is a block diagram illustrating a preferred embodiment of the drop-out detector circuit according to the invention, which is an integral feature of the A/D converter 2 in FIG. 1. In FIG. 2, the A/D converter 20 is itself of the n-bit fully parallel comparison type, having its input signal voltage range defined by $V_{max}$ and $V_{min}$ as shown in FIG. 3. The A/D converter 20 is composed of n comparators $200_1$–$200_n$, which compare analog inputs, resistors $R_1$–$R_{n+1}$ connected in series between each line setting the reference levels $V_{max}$ and $V_{min}$ for the comparators, and encoder 201 to encode the output of each comparator, and a latch circuit 202 with a digital output to latch the output of the encoder 201.

When the amplitude of the input signal to the A/D converter 20 goes beyond the range prescribed by $V_{max}-V_{min}$, an overflow or underflow occurs. The present invention detects drop-out by detecting this overflow or underflow. For this purpose, an overflow detection comparator 21 and an underflow detection comparator 22 are provided. The outputs of the comparator 21 and the comparator 22 are passed through an OR gate 23 and used as the drop-out detection signal. In other words, in cases where drop-out occurs due to the AC coupling of the A/D converter to the previous stage and there is an excess of the DC component DC in the signal read out from the video disc, the amplitude of the FM image signal has a large deviation due to the DC component, the presence of noise, and like, causing the amplitude to increase greatly. By detecting that the amplitude of the input signal of the A/D converter 20 has exceeded the $V_{max}$ or $V_{min}$ parameter, drop-out can be detected.

Figure 4:
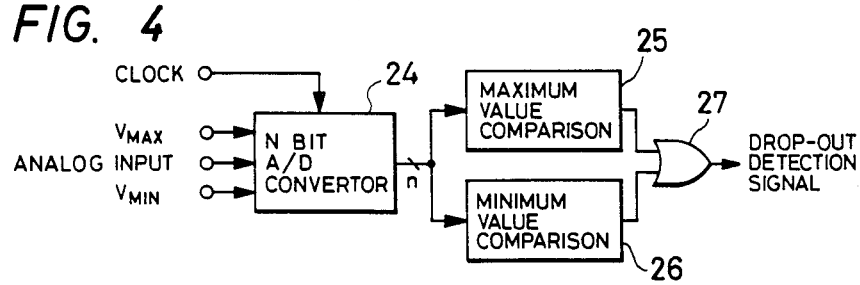
FIG. 4 is a block diagram of another embodiment of the invention.
Figure 5:
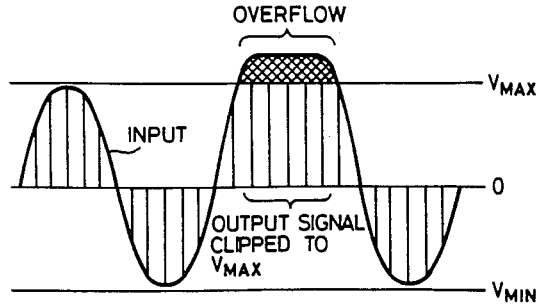
FIG. 5 is a waveform diagram of the inputs and outputs of the A/D converter in FIG. 4.

FIG. 4 is a block diagram illustrating another embodiment of the present invention. In this embodiment, when the amplitude of the input signal to the A/D converter 24 exceeds the prescribed input voltage limits, as shown in FIG. 5, the sampled digital output of the A/D converter is limited to a maximum voltage ($V_{max}$) in the case of overflow and to minimum voltage ($V_{min}$) in the case of underflow. In other words, the output is clamped to conform to the prescribed input voltage limits. Thus, drop-out can be detected by monitoring the occurrence of maximum and minimum values in the output of A/D converter 24.

In order to detect these maximum and minimum values, a maximum value comparison circuit 25 and a minimum value comparison circuit 26 are provided. The maximum value comparison circuit 25 has a comparison reference corresponding to the maximum value, and is arranged so that it produces an output whenever the output of the A/D converter 24 reaches this reference value. The minimum value comparison circuit 26 has a comparison reference corresponding to the minimum value, and is arranged so that it produces an output whenever the output of A/D converter 24 reaches this reference value. The outputs of the maximum comparison circuit 25 and the minimum comparison circuit 26 are passed through an OR gate 27 and used as the drop-out detection signal.

The above embodiments have been explained using a video disc as an example of the recording medium, but the invention may be used with a video tape. In other words, it makes no difference what medium is employed as long as the desired signal has been recorded as a high-frequency modulated signal.

As explained above, the drop-out detector circuit according to the invention has a detector means which registers when the amplitude of the signal read from the recording medium exceeds the prescribed input limits of the A/D converter used to digitize the read-out signal. Since the output of the detection means is used as the drop-out detection signal, it is possible to detect drop-out merely by the addition of a simple circuit, thus simplifying the overall circuit layout.

What is claimed is:

1. In a device for playing back a high-frequency modulated signal recorded on a recording medium, said device using an analog-to-digital (A/D) converter to digitized said signal read from said medium, a drop-out detector circuit comprising:
    detecting means for detecting when an amplitude of said read-out signal exceeds first and second predetermined reference signals of said A/D converter, an output of said detecting means being used as a drop-out detector signal.

2. A drop-out detector as claimed in claim 1, further comprising means for providing first and second predetermined reference signals to said A/D converter, and wherein said detecting means comprises:
    first comparing means for comparing an input analog signal with said first predetermined reference signal;
    second comparing means for comparing said input analog signal with said second reference signal; and
    means for producing an output signal responsive to an input from at least one of said first and second comparing means.

3. A drop-out detector as claimed in claim 2, wherein said first and second predetermined reference signals correspond, respectively, to minimum and maximum reference voltage signals for said A/D converter.

4. A drop-out detector as claimed in claim 3, wherein said first comparing means is an underflow detection comparator, said second comparing means is an overflow detection comparator, and said producing means is an OR gate.

5. A drop-out detector as claimed in claim 3, wherein said first comparing means is a minimum value comparing circuit, said second comparing means is a maximum value comparing circuit, and said producing means is an OR gate, wherein said input analog signal is limited between said minimum and maximum reference voltage signal values.

6. A method for detecting signal loss in a device for playing back a high-frequency modulated signal recorded on a recording medium, said device using an analog-to-digital (A/D) converter to digitize said signal read from said medium, said method comprising the steps of:
    detecting when an amplitude of said read-out signal exceeds first and second predetermined reference signals of said A/D converter;
    using an output of said detecting means as a drop-out detector signal.

7. A method for detecting signal loss in a device for playing back a high-frequency modulated signal recorded on a recording medium as claimed in claim 6, wherein said detecting step comprises the steps of:
    comparing an input analog signal received from a pickup for reading said high-frequency signal from said recording medium with said first predetermined reference signal;
    comparing said input analog signal with said second reference signal; and
    producing an output signal responsive to an input from at least one of said first and second comparing means.

* * * * *